US012755725B2

(12) United States Patent
Wang et al.

(10) Patent No.: US 12,755,725 B2
(45) Date of Patent: Oct. 6, 2026

(54) SOUND BARRIER SYSTEM FOR REDUCING ELECTRIC FIELD DISTORTION

(71) Applicants: STATE GRID HENAN ELECTRIC POWER RESEARCH INSTITUTE, Zhengzhou (CN); STATE GRID SMART GRID RESEARCH INSTITUTE CO. LTD., Beijing (CN); STATE GRID CORPORATION OF CHINA, Beijing (CN)

(72) Inventors: Donghui Wang, Zhengzhou (CN); Songyang Zhang, Zhengzhou (CN); Jiaqi Zhang, Beijing (CN); Degui Yao, Zhengzhou (CN); Leilei Wang, Zhengzhou (CN); Zhuangzhuang Zhang, Zhengzhou (CN); Guangzhou Wang, Zhengzhou (CN); Jingkai Nie, Beijing (CN); Qiang He, Beijing (CN); Yi Tian, Beijing (CN); Rui Li, Beijing (CN); Lin Lu, Beijing (CN); Xing Guo, Zhengzhou (CN); Yuan Li, Zhengzhou (CN); Xu Tian, Zhengzhou (CN); Weipo Liu, Zhengzhou (CN); Haodong Feng, Zhengzhou (CN)

(73) Assignees: STATE GRID HENAN ELECTRIC POWER RESEARCH INSTITUTE, Zhengzhou (CN); STATE GRID SMART GRID RESEARCH INSTITUTE CO. LTD., Beijing (CN); STATE GRID CORPORATION OF CHINA, Beijing (CN)

( * ) Notice: Subject to any disclaimer, the term of this patent is extended or adjusted under 35 U.S.C. 154(b) by 282 days.

(21) Appl. No.: 18/603,248

(22) Filed: Mar. 13, 2024

(65) Prior Publication Data

US 2024/0221712 A1 Jul. 4, 2024

Related U.S. Application Data

(63) Continuation-in-part of application No. PCT/CN2023/084543, filed on Mar. 28, 2023.

(30) Foreign Application Priority Data

Apr. 1, 2022 (CN) ......................... 202210339373.6

(51) Int. Cl.
*G10K 11/162* (2006.01)
*G01H 3/12* (2006.01)
*H02B 1/26* (2006.01)

(52) U.S. Cl.
CPC ............. *G10K 11/162* (2013.01); *G01H 3/12* (2013.01); *H02B 1/26* (2013.01)

(58) Field of Classification Search
CPC ........... G10K 11/162; G01H 3/12; H02B 1/26
(Continued)

(56) References Cited

U.S. PATENT DOCUMENTS 4,358,090 A * 11/1982 Glaesener ............. E01F 8/0082 404/6
4,750,586 A * 6/1988 Lerner ....................... E04B 9/34 181/290
(Continued)

FOREIGN PATENT DOCUMENTS

CN 104805930 A 7/2015
CN 105568878 A 5/2016
(Continued)

OTHER PUBLICATIONS

International Search Report of PCT Patent Application No. PCT/CN2023/084543 issued on Jul. 22, 2023.

*Primary Examiner* — Forrest M Phillips

(57) ABSTRACT

A sound barrier system for reducing electric field distortion includes a wall unit and a sound barrier unit. The sound barrier unit includes a sound barrier plate that, from top to bottom, includes an arc-shaped part, an inclined part, and a vertical part that are integrally formed, wherein a center of a circle of the arc-shaped part points towards an interior of a power facility, the inclined part is tilted away from the power facility from top to bottom and is tangent to the arc-shaped part, and a lower end of the vertical part is arranged on a top of the wall unit. The sound barrier system further includes an energy supply pipeline, a security device,
(Continued)

and an online monitoring device. The sound barrier system can be easily manufactured, and not only can improve an acoustic environment around a substation, but also can reduce an amplitude of an electric field.

11 Claims, 5 Drawing Sheets

(58) Field of Classification Search
USPC .......................................................... 181/202
See application file for complete search history.

(56) References Cited

U.S. PATENT DOCUMENTS

| | | | | | |
|---|---|---|---|---|---|
| 5,069,011 | A * | 12/1991 | Jenne | G10K 11/20 52/73 |
| 5,739,482 | A * | 4/1998 | Shima | E01F 8/0029 181/210 |
| 6,810,991 | B1 * | 11/2004 | Suzuki | E01F 8/0094 181/210 |
| 7,574,833 | B2 * | 8/2009 | Stark | E04B 1/8209 52/145 |
| 8,091,605 | B1 * | 1/2012 | Melhart | A47G 5/00 160/351 |
| 9,088,107 | B2 * | 7/2015 | Kowalczyszyn | H05K 5/0217 |
| 10,424,286 | B2 * | 9/2019 | Chattell | B32B 3/16 |
| 12,492,660 | B2 * | 12/2025 | Riederer | B32B 5/18 |
| 2019/0123580 | A1 * | 4/2019 | Bindea | H02J 3/14 |
| 2025/0355046 | A1 * | 11/2025 | Lanes | H01H 71/04 |

FOREIGN PATENT DOCUMENTS

| | | | |
|---|---|---|---|
| CN | 106013484 | A | 10/2016 |
| CN | 106639632 | A | 5/2017 |
| CN | 112761085 | A | 5/2021 |
| CN | 113585939 | A | 11/2021 |
| CN | 214941277 | U | 11/2021 |

* cited by examiner

SOUND BARRIER SYSTEM FOR REDUCING ELECTRIC FIELD DISTORTION

CROSS REFERENCE TO RELATED APPLICATIONS

The present application is a Continuation-In-Part Application of PCT Application No. PCT/CN2023/084543 filed on Mar. 28, 2023, which claims the benefit of Chinese Patent Application No. 202210339373.6 filed on Apr. 1, 2022. All the above are hereby incorporated by reference in their entirety.

TECHNICAL FIELD

The present disclosure relates to the technical field of sound insulation and noise reduction of power facilities, and specifically, to a sound barrier system for reducing electric field distortion.

BACKGROUND

With the continuous expansion of economic development and urban scales, power engineering construction is also rapidly developing. A necessary measure to meet a rising power demand is to add power transmission and transformation facilities, and substations have become a core hub of power transmission. On one hand, it is necessary to add new substations in a densely loaded region of a city center to increase a backup capacity and strengthen a power grid architecture. On the other hand, as an urban fringe gradually extends towards a suburb, a substation that is originally located in the suburb is gradually surrounded by newly added urban functional blocks. The above two factors make many substations closer to environmentally sensitive regions such as a residential region, a school, and a hospital. That is, natural noise attenuation space required by the substations cannot be guaranteed or is occupied, causing an increasingly prominent noise problem to the substations.

Noise in a substation is mainly from a transformer, and a frequency of the noise of the transformer is mainly concentrated on medium and low frequency bands. Therefore, a sound barrier system is often used to absorb and block the noise.

A current sound barrier system for a substation generally improves an acoustic environment by installing a steel plate sound barrier at a top of a wall of the substation. This sound barrier can improve the acoustic environment to a certain extent, but it does not consider electric field distortion of the sound barrier. In addition, after the steel plate sound barrier is installed, the wall becomes higher and needs to bear a greater wind load. Therefore, a traditional method of adding a sound barrier to an ordinary wall is difficult to meet a wind load resistance requirement after the sound barrier is installed.

SUMMARY

To overcome the shortcomings in the prior art, the present disclosure is intended to provide a sound barrier system for reducing electric field distortion.

The present disclosure adopts following technical solutions.

A sound barrier system for reducing electric field distortion includes a wall unit and a sound barrier unit, wherein the sound barrier unit includes a sound barrier plate, and the sound barrier unit, from top to bottom, sequentially includes an arc-shaped part, an inclined part, and a vertical part that are integrally formed, wherein a center of a circle of the arc-shaped part points towards an interior of a power facility, the inclined part is tilted away from the power facility from top to bottom and is tangent to the arc-shaped part, and a lower end surface of the vertical part is arranged on a top of the wall unit.

As a preferred embodiment of the present disclosure, an end that is of the arc-shaped part and not connected to the inclined part has an arc-shaped edge.

As a preferred embodiment of the present disclosure, a curvature radius of the arc-shaped part ranges from 0.084 H to 0.094 H, where H is a height of a part that is of the wall unit and protrudes from the ground.

As a preferred embodiment of the present disclosure, a centering angle of the arc-shaped part ranges from 100° to 140°.

As a preferred embodiment of the present disclosure, the sound barrier unit further includes a sound absorption layer, and a side face of the sound absorption layer is attached to an inner side of the vertical part and an inner side that is of the wall unit and close to the power facility.

As a preferred embodiment of the present disclosure, a lower end of the vertical part is provided with a sound absorption layer slot that is attached to the wall unit and forms an integral structure with the sound barrier plate, and the sound absorption layer is arranged in the sound absorption layer slot.

As a preferred embodiment of the present disclosure, the lower end face of the vertical part and the sound absorption layer slot are respectively connected to a top surface and an inner side of the wall unit by using a bolt.

As a preferred embodiment of the present disclosure, the sound absorption layer is tightly attached to the inner side of the vertical part and the sound absorption layer slot.

As a preferred embodiment of the present disclosure, the vertical part and the top of the wall unit are sealed with a sound insulation material, and an anti-corrosion layer is arranged between the vertical part and the top of the wall unit.

As a preferred embodiment of the present disclosure, the sound absorption layer is wrapped with a metal wire mesh, and the metal wire mesh is connected to the sound barrier plate.

As a preferred embodiment of the present disclosure, the sound barrier unit further includes a metal down lead.

As a preferred embodiment of the present disclosure, an upper end of the metal down lead is connected to the metal wire mesh of the sound absorption layer, and a lower end of the metal down lead is connected to a ground net of the power facility.

As a preferred embodiment of the present disclosure, a lower end of the wall unit is buried underground in an inverted-T structure.

As a preferred implementation of the present disclosure, a height H of a part that is of the wall unit and protrudes from the ground, a depth S of a part of the wall unit buried underground, a height s of the inverted-T structure, and a bottom width d of the inverted-T structure meet a following equation: H: S: s: d=10:5:1:3.

As a preferred embodiment of the present disclosure, the lower end that is of the wall unit and buried underground is provided with a reserved channel.

As a preferred embodiment of the present disclosure, the sound barrier system further includes a security device and an online monitoring device, and both the security device and the online monitoring device are arranged on a side of the wall unit away from the power facility.

As a preferred embodiment of the present disclosure, the online monitoring device includes a display screen and a foldable sound level meter.

As a preferred embodiment of the present disclosure, the foldable sound level meter is connected to the display screen and is configured to transmit collected data to the display screen for displaying.

As a preferred embodiment of the present disclosure, both the online monitoring device and the security device are connected to and powered by an energy supply pipeline.

As a preferred embodiment of the present disclosure, both the security device and the energy supply pipeline are arranged on the top of the wall unit.

The present disclosure has following beneficial effects compared with the prior art:

A sound barrier system for reducing electric field distortion in the present disclosure can be easily manufactured, and is economical and practical. The sound barrier system not only can improve an acoustic environment around a substation, but also can reduce an amplitude of an electric field at a top of a sound barrier to 80% of an amplitude of an electric field at a top of a traditional sound barrier. In addition, a sound barrier unit adopts a sound barrier plate designed with an arc-shaped part, and a bottom part that is of a wall and buried underground adopts an inverted-T structure, which can greatly improve a wind load resistance capability of the system to resist at least grade 9 wind. In addition, the sound barrier system provides an energy supply facility for an online monitoring device in the acoustic environment, thereby improving stability of the online monitoring device.

REFERENCE NUMERALS

1: wall unit;
101: reserved channel;
2: sound barrier unit;
201: sound barrier plate; 2011: arc-shaped part; 2012: inclined part; 2013: vertical part; 2014: sound absorption layer slot; 202: sound absorption layer; 2021: metal wire mesh;
203: metal down lead;
3: security device;
4: energy supply pipeline;
5: display screen; and
6: foldable sound level meter.

DETAILED DESCRIPTION

The present disclosure is further described below with reference to the accompanying drawings. The following embodiments are only used for describing the technical solutions of the present disclosure more clearly, and are not intended to limit the protection scope of the present disclosure.

Figure 1:
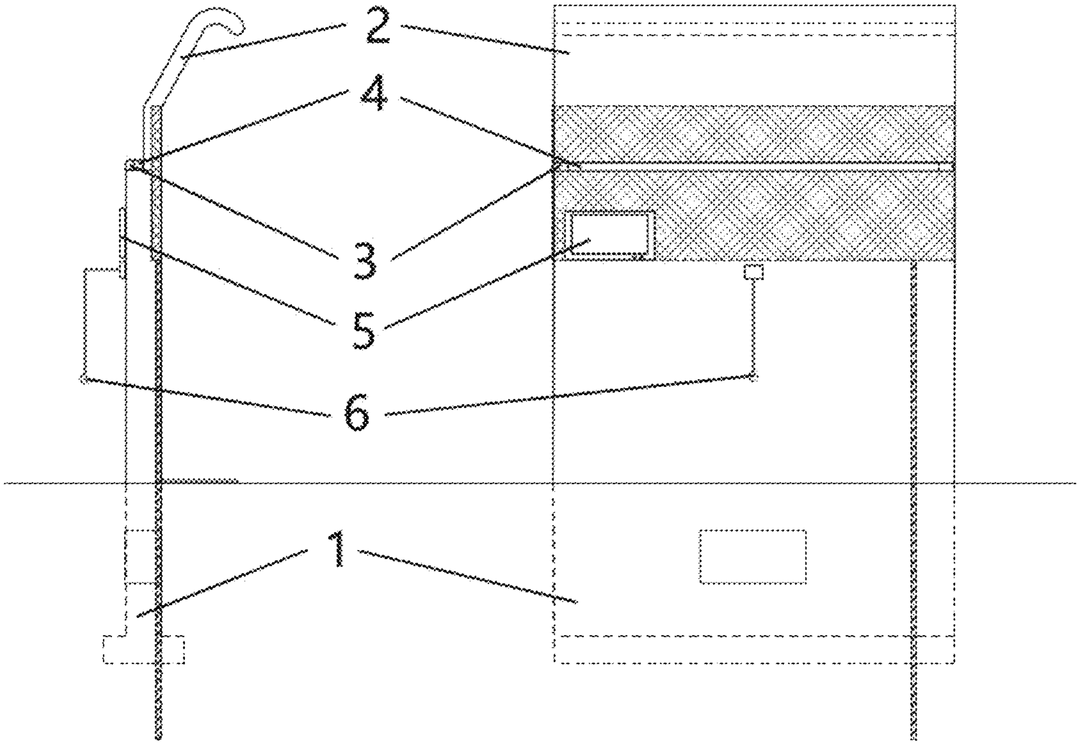
FIG. 1 is a side view and a front view of a sound barrier system for reducing electric field distortion according to the present disclosure.

FIG. 1 is a side view and a front view of a sound barrier system for reducing electric field distortion according to the present disclosure. As shown in FIG. 1, the sound barrier system for reducing electric field distortion according to the present disclosure mainly includes a wall unit 1 and a sound barrier unit 2.

Figure 3:
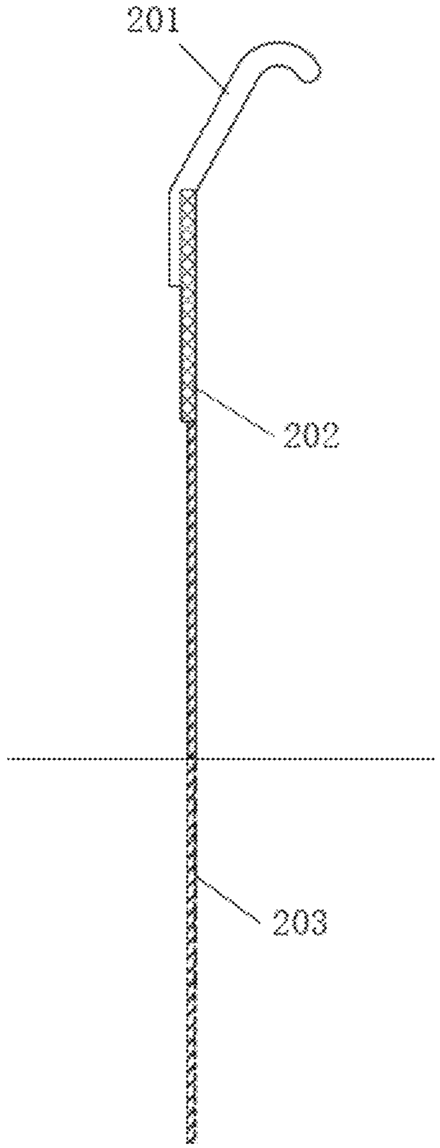
FIG. 3 is a schematic structural diagram of a sound barrier unit of a sound barrier system for reducing electric field distortion according to the present disclosure.
Figure 4:
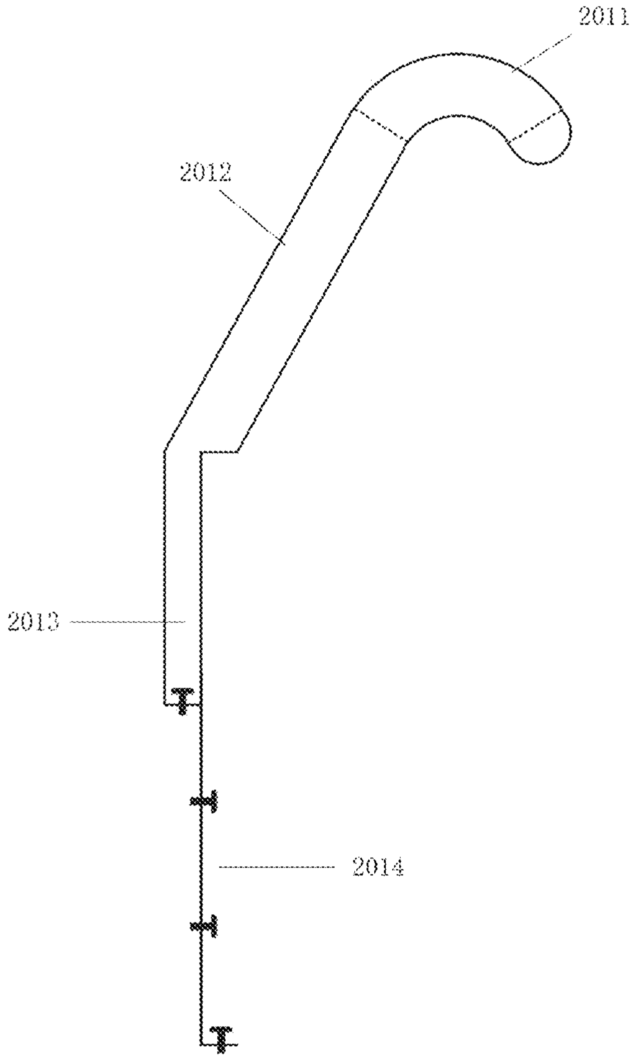
FIG. 4 is a schematic structural diagram of a sound barrier plate of a sound barrier system for reducing electric field distortion according to the present disclosure.

As shown in FIG. 3, the sound barrier unit 2 includes a sound barrier plate 201. Referring to FIG. 4, the sound barrier plate 201, from top to bottom, sequentially includes an arc-shaped part 2011, an inclined part 2012, and a vertical part 2013 that are integrally formed. A center of a circle of the arc-shaped part 2011 points towards an interior of a power facility, the inclined part 2012 is tilted away from the power facility from top to bottom and is tangent to the arc-shaped part 2011, and a lower end face of the vertical part 2013 is arranged on a top of the wall unit 1. The sound barrier plate 201 can reduce electric field distortion, improve quality of an acoustic environment, and resist a wind load. In the shown embodiment, the sound barrier plate 201 is designed with a metal material, which can significantly reduce a distortion effect of a top structure of a sound barrier on an electric field generated by an overhead line while increasing an effective height of the sound barrier, thereby reducing a discharge risk of the overhead line for the sound barrier.

An end that is of the arc-shaped part 2011 and not connected to the inclined part 2012 has an arc-shaped edge.

A curvature radius of the arc-shaped part 2012 ranges from 0.084 H to 0.094 H, where H is a height of a part that is of the wall unit 1 and protrudes from the ground. A centering angle of the arc-shaped part 2012 ranges from 100° to 140°.

Referring to FIG. 3, the sound barrier unit further includes a sound absorption layer. A side face of the sound absorption layer is attached to an inner side of the vertical part 2013 and an inner side that is of the wall unit 1 and close to the power facility.

Referring to FIG. 4, a lower end of the vertical part 2013 is provided with a sound absorption layer slot 2014 that is attached to the wall unit 1 and forms an integral structure with the sound barrier plate 201, and the sound absorption layer 202 is arranged in the sound absorption layer slot 2014. The lower end face of the vertical part 2013 and the sound absorption layer slot 2014 are respectively connected to a top surface and an inner side of the wall unit 1 by using a bolt. The absorption layer 202 is tightly attached to the inner side of the vertical part 2013 and the sound absorption layer slot 2014. A plurality of bolt structures can ensure a wind load resistance requirement of the sound barrier system. The sound absorption layer slot and a corresponding sealing structure are designed to ensure a fixed connection and gap sealing between the sound absorption layer 202 and the sound barrier plate 201.

The vertical part 2013 and the top of the wall unit 1 are sealed with a sound insulation material, and an anti-corrosion layer is also arranged between the vertical part 2013 and the top of the wall unit 1.

The sound absorption layer 202 is wrapped with a metal wire mesh 2021, and the metal wire mesh 2021 is connected to the sound barrier plate 201.

The sound barrier unit 2 further includes a metal down lead 203. An upper end of the metal down lead 203 is connected to the metal wire mesh 2021 of the sound absorption layer 202, and a lower end of the metal down lead 203 is connected to a ground net of the power facility.

The sound barrier unit 2 is projected to the ground to form an inspection path on an inner side of a factory boundary, providing a rainproof route for operation and maintenance personnel to perform inspection inside a substation.

Figure 2:
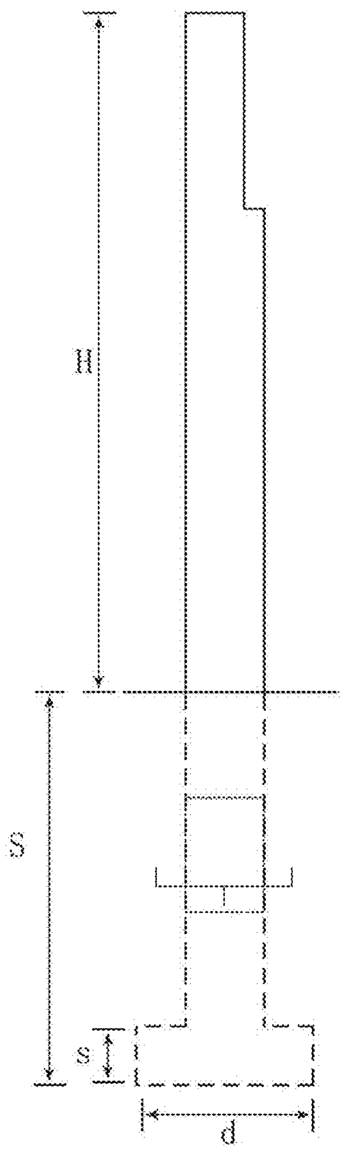
FIG. 2 is a schematic structural diagram of a wall unit of a sound barrier system for reducing electric field distortion according to the present disclosure.

Referring to FIG. 2, a lower end of the wall unit 1 is buried underground in an inverted-T structure to improve a wind load resistance capability of the sound barrier system. The height H of the part that is of the wall unit 1 and protrudes from the ground, a depth S of the lower end that is of the wall unit 1 and buried underground, a height s of the inverted-T structure, and a bottom width d of the inverted-T structure meet a following equation: H: S: s: d=10:5:1:3.

The lower end that is of the wall unit 1 and buried underground is provided with a reserved channel 101 to reserve a channel for a cable trench, water supply and drainage facilities, and the like.

Referring to FIG. 1, the sound barrier system further includes a security device 3 and an online monitoring device. Both the security device 3 and the online monitoring device are located on a side of the wall unit 1 away from the power facility. The online monitoring device includes a display screen 5 and a foldable sound level meter 6. The foldable sound level meter 6 is connected to the display screen 5 and is configured to transmit collected data to the display screen 5 for displaying.

Both the online monitoring device and the security device 3 are connected to and powered by an energy supply pipeline 4. Both the security device 3 and the energy supply pipeline 4 are arranged on the top of the wall unit 1.

A method for improving an acoustic environment is also provided, including following steps:

Step 1: Using a sound level meter to collect acoustic environment information around a power facility, summarizing and transmitting the collected acoustic environment information to a control system to determine a construction site of a sound barrier;

Step 2: Constructing the above-described sound barrier system at the construction site that can reduce electric field distortion, improve quality of an acoustic environment, and resist a wind load, such that an external acoustic environment of the construction site meets a predetermined range; and Step 3: Collecting acoustic environment information outside the sound barrier system by using a foldable sound level meter 6, and monitoring quality of the acoustic environment of the construction site.

In the step 1, when noise measured at the construction site exceeds a limit requirement of a functional zone of an acoustic environment in a region in which the power facility is located, a sound barrier is constructed at the construction site.

Figure 5A:
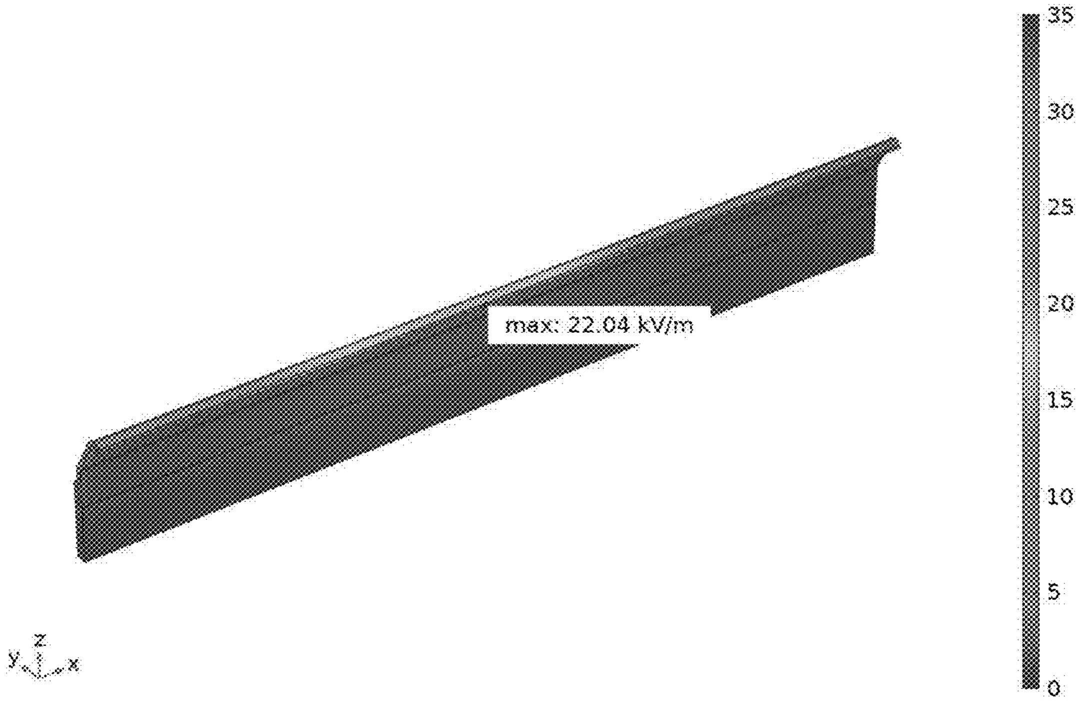
FIG. 5*a* and FIG. 5*b* respectively show modeling of electric field intensity of a sound barrier system for reducing electric field distortion according to the present disclosure and modeling of electric field intensity of a traditional sound barrier system.
Figure 5B:
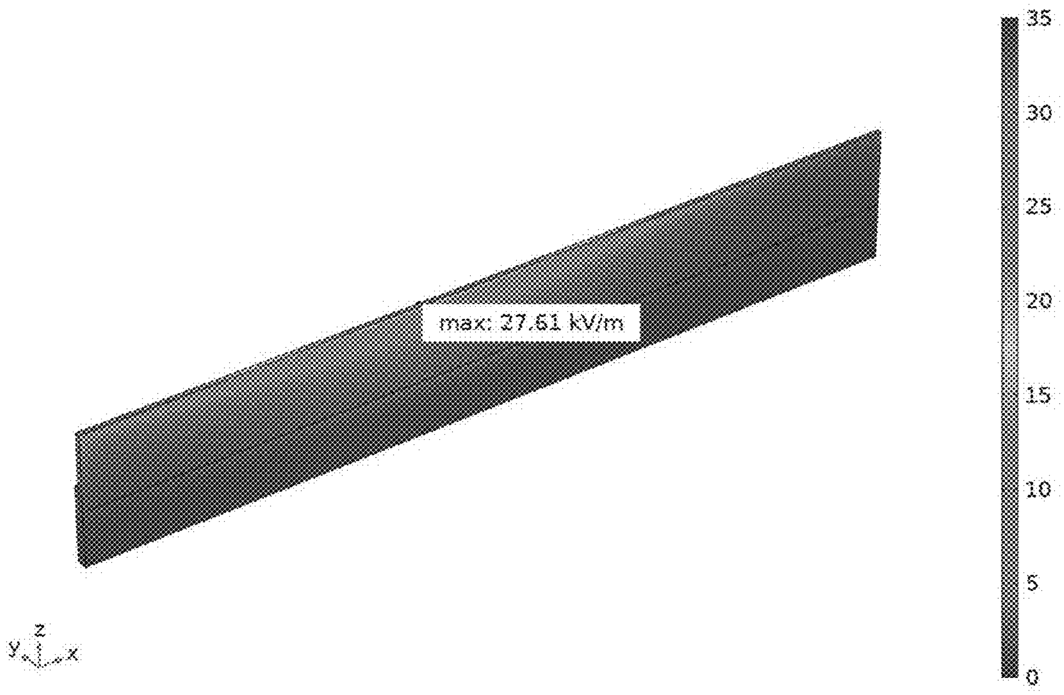

As shown in FIG. 5*a* and FIG. 5*b*, an amplitude of an electric field at a top of the sound barrier system decreases to 80% of an amplitude of an electric field at a top of a traditional sound barrier system.

The present disclosure has following beneficial effects compared with the prior art:

A sound barrier system for reducing electric field distortion in the present disclosure can be easily manufactured, and is economical and practical. The sound barrier system not only can improve an acoustic environment around a substation, but also can reduce an amplitude of an electric field at a top of a sound barrier to 80% of an amplitude of an electric field at a top of a traditional sound barrier, such that quality of the acoustic environment meets a limit requirement of a functional zone of the acoustic environment in a region in which a power facility is located. In addition, a sound barrier unit adopts a sound barrier plate designed with an arc-shaped part, and a bottom part of a wall buried underground adopts an inverted-T structure, which can greatly improve a wind load resistance capability of the system to resist at least grade 9 wind. In addition, the sound barrier system provides an energy supply facility for an online monitoring device in the acoustic environment, thereby improving stability of the online monitoring device.

The quality of the acoustic environment meets the GB 12348-2008 Emission Standard for Industrial Enterprises Noise at Boundary.

The applicant of the present disclosure has made a detailed description of the implementation examples of the present disclosure with reference to the accompanying drawings in the specification. However, those skilled in the art should understand that the above implementation examples are only preferred implementation solutions of the present disclosure, and the detailed description is only to help readers better understand the spirit of the present disclosure, rather than to limit the protection scope of the present disclosure. On the contrary, any improvement or modification based on the spirit of the present disclosure shall fall within the protection scope of the present disclosure.

The invention claimed is:

1. A sound barrier system for reducing electric field distortion, comprising a wall unit and a sound barrier unit, wherein the sound barrier unit comprises a sound barrier plate, and the sound barrier plate, from top to bottom, sequentially comprises an arc-shaped part, an inclined part, and a vertical part that are integrally formed, wherein a center of a circle of the arc-shaped part points towards an interior of a power facility, the inclined part is tilted away from the power facility from top to bottom and is tangent to the arc-shaped part, and a lower end face of the vertical part is arranged on a top of the wall unit;

an end that is of the arc-shaped part and not connected to the inclined part has an arc-shaped edge;

a curvature radius of the arc-shaped part is in a range from 0.084 H to 0.094 H, where H is a height of a part that is of the wall unit and protrudes from the ground; and a centering angle of the arc-shaped part is in a range from 100° to 140°, wherein the sound barrier unit further comprises a sound absorption layer, and a side face of the sound absorption layer is attached to an inner side of the vertical part and an inner side that is of the wall unit and close to the power facility.

2. The sound barrier system for reducing electric field distortion according to claim 1, wherein a lower end of the vertical part is provided with a sound absorption layer slot that is attached to the wall unit and forms an integral structure with the sound barrier plate, and the sound absorption layer is arranged in the sound absorption layer slot;

the lower end face of the vertical part and the sound absorption layer slot are respectively connected to a top surface and an inner side of the wall unit by using a bolt; and the sound absorption layer is tightly attached to the inner side of the vertical part and the sound absorption layer slot.

3. The sound barrier system for reducing electric field distortion according to claim 1, wherein the vertical part and the top of the wall unit are sealed with a sound insulation material, and an anti-corrosion layer is arranged between the vertical part and the top of the wall unit.

4. The sound barrier system for reducing electric field distortion according to claim 1, wherein the sound absorption layer is wrapped with a metal wire mesh, and the metal wire mesh is connected to the sound barrier plate.

5. The sound barrier system for reducing electric field distortion according to claim 4, wherein the sound barrier unit further comprises a metal down lead; and an upper end of the metal down lead is connected to the metal wire mesh of the sound absorption layer, and a lower end of the metal down lead is connected to a ground net of the power facility.

6. The sound barrier system for reducing electric field distortion according to claim 1, wherein a lower end of the wall unit is buried underground has an inverted-T structure; and a height H of a part that is of the wall unit and protrudes from the ground, a depth S of the lower end of the wall unit buried underground, a height S of the inverted-T structure, and a bottom width d of the inverted-T structure meet a following equation: H: S: S: d=10:5:1:3.

7. The sound barrier system for reducing electric field distortion according to claim 6, wherein the lower end that is of the wall unit and buried underground is provided with a reserved channel.

8. The sound barrier system for reducing electric field distortion according to claim 1, wherein the sound barrier system further comprises a security device and an online monitoring device, and both the security device and the online monitoring device are arranged on a side of the wall unit away from the power facility.

9. The sound barrier system for reducing electric field distortion according to claim 8, wherein the online monitoring device comprises a display screen and a foldable sound level meter; and the foldable sound level meter is connected to the display screen and is configured to transmit collected data to the display screen for displaying.

10. The sound barrier system for reducing electric field distortion according to claim 8, wherein both the online monitoring device and the security device are connected to and powered by an energy supply pipeline.

11. The sound barrier system for reducing electric field distortion according to claim 8, wherein, both the security device and the energy supply pipeline are arranged on the top of the wall unit.

* * * * *